(No Model.)  2 Sheets—Sheet 1.

E. F. AUTENRIETH.
VARIABLE DRIVING MECHANISM.

No. 395,258.  Patented Dec. 25, 1888.

Fig. 1.

Witnesses:
O. L. Sundgren
Joseph W. Roe

Inventor:
Ernst F. Autenrieth
by attorney
Henry T. Brown (No Model.) 2 Sheets—Sheet 2.
E. F. AUTENRIETH.
VARIABLE DRIVING MECHANISM.
No. 395,258. Patented Dec. 25, 1888.
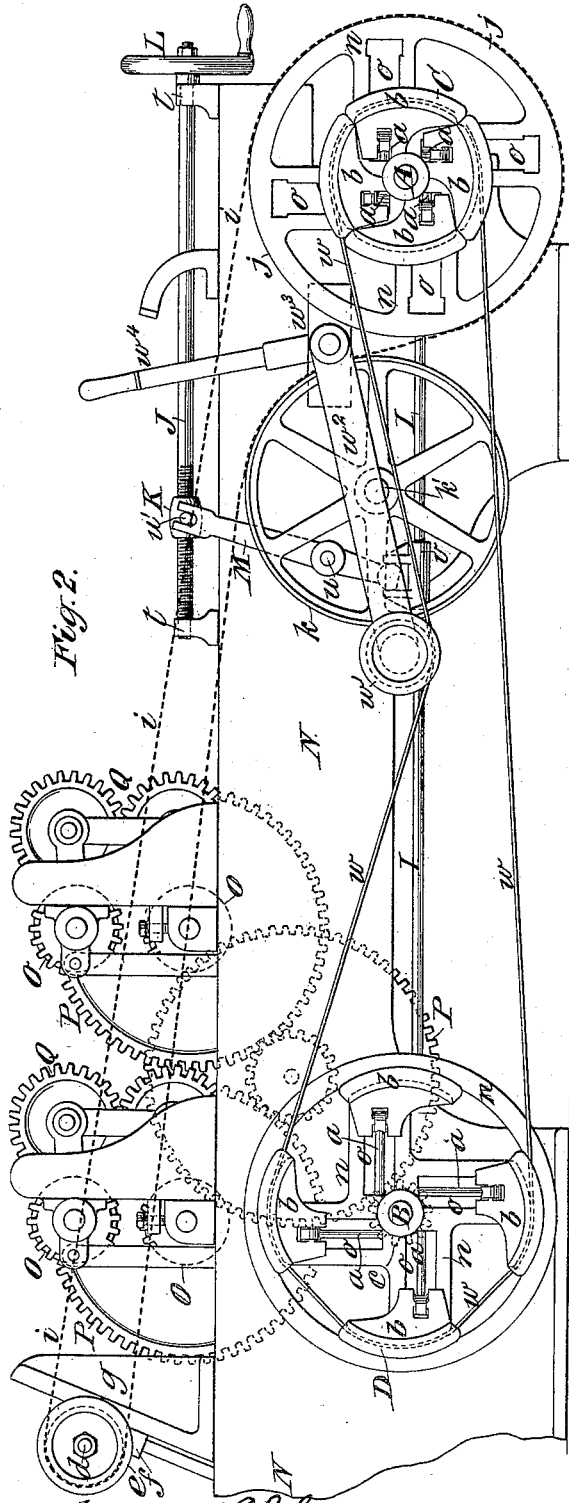
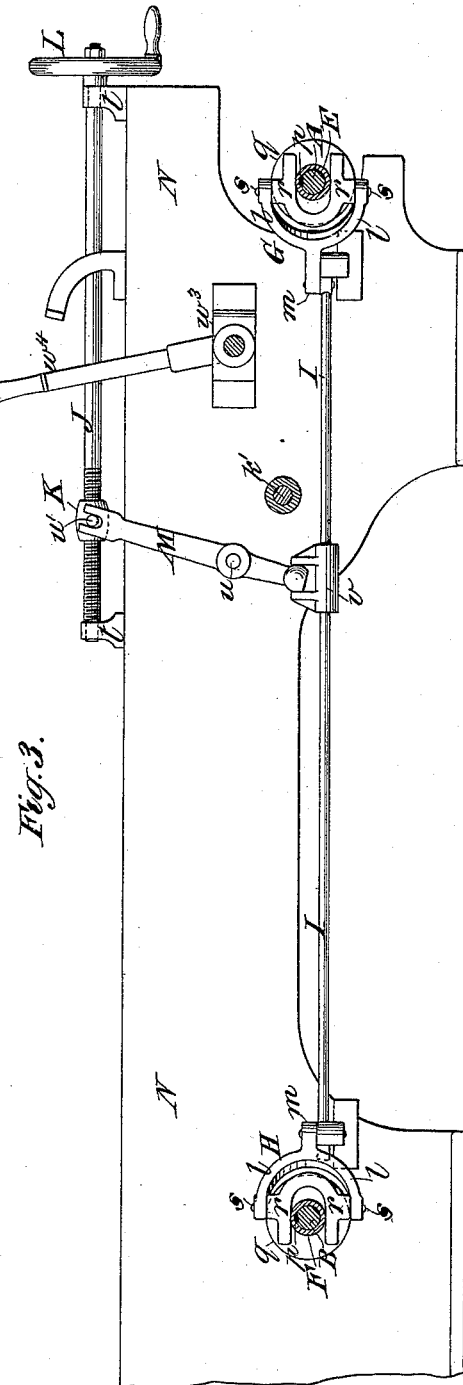

United States Patent Office.

ERNST F. AUTENRIETH, OF NEW YORK, N. Y., ASSIGNOR TO THE GLEN COVE MACHINE COMPANY, OF NEW YORK.

VARIABLE DRIVING MECHANISM.

SPECIFICATION forming part of Letters Patent No. 395,258, dated December 25, 1888.

Application filed August 13, 1888. Serial No. 282,679. (No model.)

*To all whom it may concern:*

Be it known that I, ERNST F. AUTENRIETH, of the city and county of New York, in the State of New York, have invented a new and useful Improvement in Variable Driving Mechanism for Machinery, of which the following is a specification, reference being had to the accompanying drawings.

This invention relates to variable driving mechanism applicable in connection with expanding pulleys which are composed of a series of sector-like members and devices for producing the spreading apart or expanding and the contracting or drawing together of said members.

I will now proceed to describe the improvement with reference to the drawings, and will afterward point out its novelty in claims.

Figure 1 represents a plan view of certain parts of a wood-planing machine having a variable driving mechanism embodying my improvement applied thereto. Fig. 2 represents a side view corresponding to Fig. 1; and Fig. 3, a side view, partly in section, corresponding to Figs. 1 and 2, with certain parts removed.

Like letters of reference indicate corresponding parts in the several figures.

N designates the frame of the planing-machine, A the driving-shaft, and B a driven shaft.

O designates two pairs of feed-rollers, and P a system of spur-gearing through which and the back gearing, Q, motion is communicated to the feed-rollers by a spur-wheel, $c$, on the driven shaft B.

R is an adjustable cutter-head, the shaft $d$ of which is provided with a driven pulley, $e$, and is carried in bearing-boxes, $f$, in inclined guide-brackets, $g$, attached to the frame N.

The construction and arrangement of the above-mentioned parts of the wood-planing machine are well known and in common use in such machines, the motive power being derived from an endless belt, to receive which the driving-shaft A is provided with a fast pulley, $h$, and a loose pulley, $h'$. The cutter-head is driven by a belt, $i$, (shown in dotted lines in Fig. 2,) passing around the pulley $j$ on the driving-shaft A and over a guide-pulley, $k$, carried on a stud, $k'$, projecting from the frame N.

An expanding and contracting pulley, C, is fixed upon the driving-shaft A, and in line therewith on the driven shaft B is fixed another expanding and contracting pulley, D. Each of the pulleys C and D consists of a series of sector-like members, $b$, and devices for moving the said members toward and from the centers of their respective shafts. The said devices are so connected with each other that when one of said devices is moved in a direction to spread or expand its said members the other is moved in a direction to draw together or contract its said members.

E and F are sliding hubs or collars on the shafts A and B, respectively, each of which hubs or collars is connected by rods $a$ with the several members $b$ of the corresponding pulley, whereby the said members may be spread and contracted by sliding the corresponding hub or collar back and forth on its shaft, and the said hubs are so connected with each other that when one of said hubs or collars is moved in a direction to spread or expand the members $b$ of its pulley the other hub or collar will be moved in a direction to contract the members $b$ of its pulley.

G and H are two forked bell-crank levers, one for each of the sliding hubs E and F, the forked arms $l$ of said levers respectively engaging with its sliding hub or collar.

I is a rod by which the straight arms $m$ of the said levers are connected together, whereby the sector-like members are moved simultaneously. The position of said bell-cranks relatively to the respective hubs or collars is reversed in this example by placing both bell-crank levers between the axles A and B, whereby when the rod I is moved in a direction to expand one pulley the other pulley will be contracted.

In the example represented in the drawings the expanding and contracting pulleys C and D are of a construction described in my application for Letters Patent, Serial No. 281,009, filed July 25, 1888, the sector-like members or segments $b$ being fitted to slide on face-plates $n$ in tangentially-arranged guides or guide-slots $o$ in said face-plate, the hubs or collars E and F being fitted to turn with and slide upon the axles toward and from said face-plates, and the rods $a$ being pivotally connected with said members $b$ and hubs E and F to move in planes tangential, respectively, to a circle concentric with the corresponding face-plate and shaft. The sliding hubs or collars are prevented from turning on the respective shafts by feathers $p$ in the shafts and corresponding grooves in the hubs or collars.

The hubs or collars E and F are provided with grooved heads $q$, into which forks $r$ are fitted, said forks $r$ being pivotally attached to the forked arms of the bell-cranks by pivot-pins $s$, and the engagement of the bell-cranks with the hubs or collars is thereby effected.

A screw-shaft, J, is carried in bearings $t$ on the frame N, and has a nut, K, and a hand-wheel thereon. M designates a lever pivoted to frame N by a fulcrum pin or stud, $u$. The lever M is forked at one end to embrace the nut K, and the parts of the forked ends are slotted to engage lugs or pins $u'$, which project from opposite sides of the nut. The other end is pivotally attached to the rod I by engaging with a socket-piece, $v$, on said rod I.

When the shaft J is revolved in either direction, the nut K is moved longitudinally thereon and moves the lever M, and consequently the rod I, according to the direction in which the said shaft J is revolved, thereby simultaneously contracting one of the pulleys C or D and expanding the other. The driven pulley D is operated by a belt, $w$, from the driving-pulley C. When it is necessary to increase the speed of the driven pulley, that pulley is contracted, while the driving-pulley is enlarged. To diminish the speed of the driven pulley, it is enlarged or expanded, while the driver is contracted. The circumference of one being increased as much as that of the other is reduced, the same length of belt is always required, whatever may be the changes in the relative proportion of one circumference to the other produced by the shifting mechanism.

To provide for any possible irregularities in the expansion and contraction of the driving and driven pulleys, a tightening or tension pulley, $w'$, is provided, which, by its unbalanced weight on the belt, will maintain a practically uniform strain or tension of said belt. The tension-pulley is attached to one end of an arm, $w^2$, the other end of which projects from a shaft pivoted to frame N at $w^3$ and provided with a hand-lever, $w^4$, by which the pulley $w'$ may be lifted up off of the belt $w$.

By combining the two expanding pulleys and a connection whereby one expands as the other contracts the increasing centrifugal force developed in the one that expands is counteracted or counterbalanced by the diminishing centrifugal force of the one that contracts.

What I claim as new, and desire to secure by Letters Patent, is—

1. The combination, with a driving-shaft and a driven shaft and two expansible and contractible pulleys, one on each shaft, each consisting of a series of sector-like members, and a sliding hub or collar on each of said shafts connected by rods with the sector-like members of the pulley thereon, of two forked bell-crank levers, one for each sliding hub or collar and fulcrumed on a fixed support, the forked arms of said levers respectively engaging with its sliding hub or collar, and a rod connecting the straight arms of said levers, whereby the sector-like members are moved simultaneously, the position of said bell-cranks relatively to the respective hubs or collars being reversed, whereby when the rod is moved in a direction to expand the sector-like members of one pulley the members of the other pulley will be contracted, substantially as specified.

2. The combination, with the driving-shaft A, the driven shaft B, the expansible and contractible pulleys C and D, and the sliding hubs or collars E and F on said shafts, and the rods $a$, connecting said hubs or collars to the sector-like members $b$ of said pulleys, of the reversed bell-crank levers G and H, engaging said hubs or collars, respectively, the rod I, connecting said bell-cranks with each other, the screw-shaft J and nut K, and hand-wheel L on said screw-shaft, and the lever M, pivotally connected at one end with the nut K and at the other end with the rod I, all substantially as specified, and for the purpose set forth.

ERNST F. AUTENRIETH.

Witnesses:
MINERT H. LINDEMAN,
FREDK. HAYNES.